July 12, 1938.　　　W. E. HARRIS　　　2,123,360

APPARATUS FOR OBTAINING LINEAR MEASUREMENTS

Filed June 10, 1936

Inventor
William E. Harris
W. S. McPowell
Attorney

Patented July 12, 1938

2,123,360

UNITED STATES PATENT OFFICE 2,123,360

APPARATUS FOR OBTAINING LINEAR MEASUREMENTS

William E. Harris, Cincinnati, Ohio, assignor of one-half to John D. Powell, Cincinnati, Ohio Application June 10, 1936, Serial No. 84,505

1 Claim. (Cl. 33—141)

This invention relates to an improved portable device for quickly and conveniently obtaining linear measurements.

In ascertaining many linear measurements, it has been the customary practice to employ measuring tapes of metal or fabric, which are difficult and awkward to handle and take considerable time in obtaining desired data. It is the object of the present invention to provide a conveniently operated portable tool comprising a measuring wheel of predetermined circumferential dimensions supported by a suitable frame and adapted to be rolled over the surface or surfaces to be measured, and wherein the frame carries an automatically actuated counter having its actuating arm disposed in the path of a pin or stud projecting laterally from the side of said wheel, so that upon each complete rotation of the latter, the counter mechanism will be actuated to register a unit of linear measurement.

Another object of the invention resides in providing one or more of the sides of the wheel with indications denoting fractions of such unit of measurement, so that the device may be employed in denoting feet and inches or other units of linear measurement.

A further object of the invention resides in providing the frame of the instrument contiguous to the side of the wheel containing the scale bearing fractions of a given unit of measurement with a pointer or zero indicator, in order to provide for the convenience of the operator in the reading of the instrument for ascertaining definitely such fractional increments of a unit of linear measurement.

Further objects of the invention reside in the provision of a measuring device of the character set forth which includes an elongated handle portion permitting the device to be operated while the user thereof is standing or walking in an erect position, and wherein the handles are of telescopic design so that when the device is not in use, it may be stored compactly in but a minimum of storage space; in providing the measuring wheel with a circumferentially disposed tire of a resilient material, so that the device may be easily and silently operated over a floor or other plane surface; and in providing a simple and inexpensive measuring instrument by which accurate linear measurements may be taken in a short space of time without involving undue labor or fatigue on the part of the operator.

For a further understanding of the invention, reference is to be had to the following description and the accompanying drawing, wherein.

Figure 1:
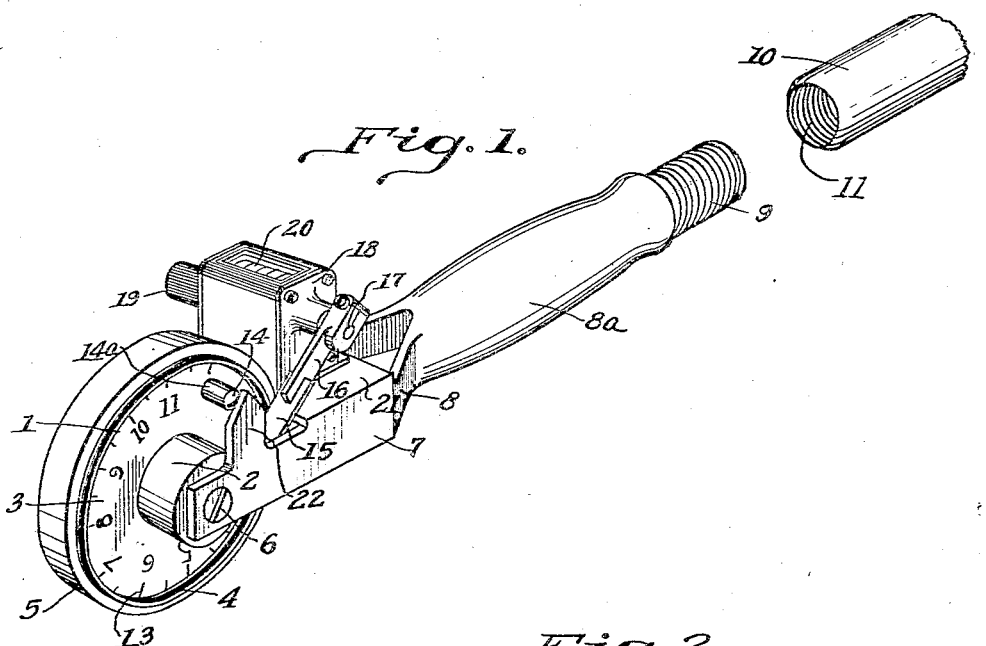
Fig. 1 is a perspective view of the measuring instrument comprising the present invention.
Figure 2:
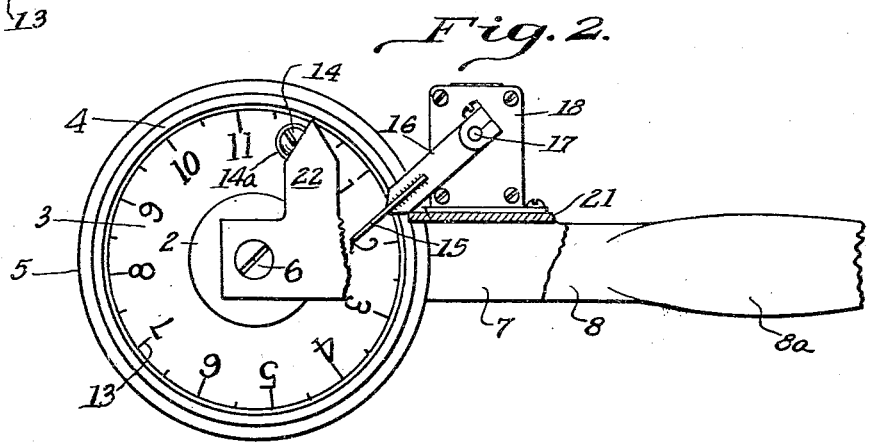
Fig. 2 is a side elevation thereof, with parts of the frame broken away to disclose hidden structure.
Figure 3:
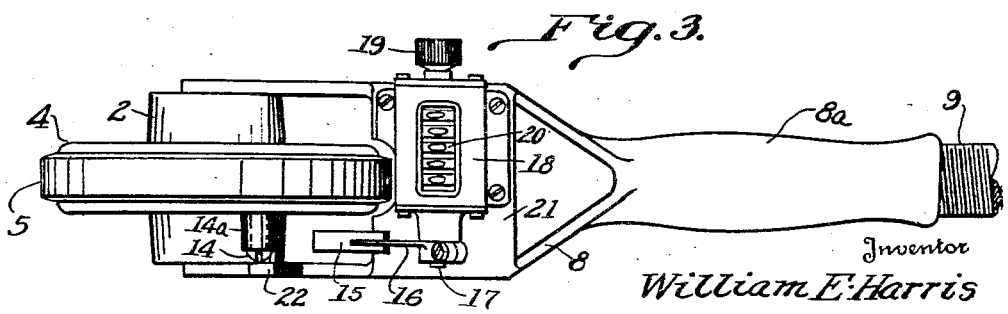
Fig. 3 is a top plan view of the instrument.
Figure 4:
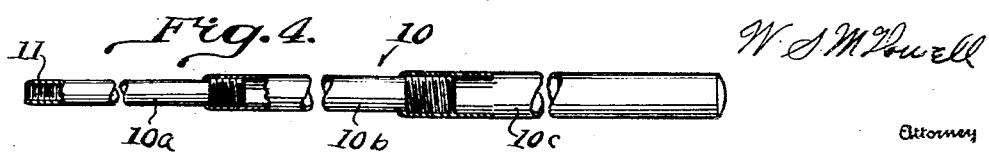
Fig. 4 is a detail view, partly in section, of a telescopic handle.

Referring more particularly to the drawing, the improved measuring instrument comprising the present invention embodies a measuring wheel 1, which includes a hub 2, a vertical web 3 and an outer rim 4, the latter being formed preferably to receive a tire 5 of a resilient material. The wheel is supported for rotation about an axle 6 carried in connection with the forward end of a yoke-shaped frame 7, the rear end of said frame converging as at 8 to form a hand grip 8a having a threaded stud 9 formed at its rear end. The forward end of a handle 10 is internally threaded as at 11 for reception of the stud 9. The handle 10 may be of any suitable length, and as shown in Fig. 4, the handle includes a plurality of threadedly connected, interfitting, telescopic sections 10a, 10b and 10c. It is preferable to use a telescopic handle for convenience in packing the instrument into a brief case or pocket, not shown, of small dimensions. When it is desired to measure a surface within the operator's reach, the device may be grasped by the hand grip 8a, eliminating the necessity of attaching the handle 10.

One or more of the side surfaces of the web 3 of the measuring wheel is provided with a series of circularly spaced graduations indicating inches, or other fractional parts of a desired unit of measurement, as indicated by the numeral 13, and projecting laterally from the web 3 is a pin 14 which carries a roller 14a. As the wheel revolves, the roller 14a intermittently contacts with the flexible end 15 of a rocker arm 16, which is fixed upon the actuating shaft 17 of a standard "Veeder" or other suitable counter. By this arrangement, whenever the wheel 1 completes each revolution thereof, the counter mechanism 18 will be actuated to record a unit of measurement. The mechanism 18 may also be provided with the customary re-setting control 19, if desired, to provide zero indications on the numbered computing reels thereof, which are viewable through the glazed opening 20 in the top of the counter casing. The counter itself is preferably positioned on and secured to a transverse shelf 21 formed with the frame 7 immediately to the rear of the wheel 1.

Arising from the frame 7, adjacent to the side of the wheel 1, is a stationary pointer 22 which is adapted to be registered with the zero indication of the fractional units of linear measurement 13 provided on the side of the wheel 1.

Thus, in obtaining a given linear measurement, the upper end of the pointer 22 is aligned with the zero indication on the scale 13 and the counter mechanism 18 is also set at zero. The instrument is then advanced along the linear surface to be measured. With each foot, or other equivalent unit of measurement, the counter mechanism is tripped once and its numeral bearing reels actuated to record such actuation and indicate the same through the sight opening 20. If the distance undergoing measurement terminates in a fraction of the given unit of measurement, such fractional distance may be indicated by noting the position of the numerals on the scale 13 with respect to the pointer 22. In this manner, both feet and inches in a given measuring operation will be clearly indicated and capable of being readily noted by the operator.

By the construction of the instrument, the same is capable of being readily employed by but a single operator in the making of measurements, thus dispensing with the use of an assistant who is quite commonly employed when measurements are taken with the use of linear standard measuring tape. Also, with the use of the present invention, linear measurements of any kind may be very rapidly taken with the operator of the instrument standing or walking in an erect and comfortable position.

While I have described what I consider to be the preferred form of the present invention, nevertheless, it will be understood that the same is subject to considerable modification and structural variation without departing from the essential features of the invention as the latter have been expressed in the following claim.

What is claimed is:

In a portable device for measuring and indicating linear distances having a frame, a hand grip formed in connection with said frame at one end thereof, a freely rotatable surface engaging wheel carried by said frame, a pin extending laterally from said wheel and movable therewith, a roller carried by said pin, and a counter mechanism carried by said frame, said counter mechanism being provided with a rocking shaft, an arm secured to the outer end of said rocking shaft, a flexible engaging element secured to the outer end of said arm and projecting into the path of movement of said roller whereby rotation of said wheel will impart motion to said arm through contact with said engaging element, whereby when the arm secured to the rocking shaft reaches the limit of its movement, continued motion of the pin will flex the engaging element without strain on the arm until the pin passes thereover.

WILLIAM E. HARRIS.